United States Patent
Aburatani et al.

(10) Patent No.: US 11,075,404 B2
(45) Date of Patent: Jul. 27, 2021

(54) GLASS COMPRISING SOLID ELECTROLYTE PARTICLES AND LITHIUM BATTERY

(71) Applicant: IDEMITSU KOSAN CO., LTD., Tokyo (JP)

(72) Inventors: Ryo Aburatani, Sodegaura (JP); Minoru Senga, Sodegaura (JP); Tsuyoshi Ota, Sodegaura (JP); Masaru Nakagawa, Sodegaura (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 198 days.

(21) Appl. No.: 16/232,832

(22) Filed: Dec. 26, 2018

(65) Prior Publication Data
US 2019/0181497 A1    Jun. 13, 2019

Related U.S. Application Data

(62) Division of application No. 14/680,514, filed on Apr. 7, 2015, now abandoned, which is a division of
(Continued)

(30) Foreign Application Priority Data

Apr. 10, 2009  (JP) .................................. 2009-096482

(51) Int. Cl.
*H01M 10/0562* (2010.01)
*C03B 19/12* (2006.01)
(Continued)

(52) U.S. Cl.
CPC ......... *H01M 10/0562* (2013.01); *C03B 19/12* (2013.01); *C03C 1/02* (2013.01);
(Continued)

(58) Field of Classification Search
CPC .. H01M 10/0562; H01M 10/052; C03B 19/12
See application file for complete search history.

(56) References Cited

U.S. PATENT DOCUMENTS

| 5,934,579 A | 8/1999 | Hiersche |
| 2010/0200795 A1 | 8/2010 | Ota et al. |
| 2011/0108642 A1 | 5/2011 | Hama et al. |

FOREIGN PATENT DOCUMENTS

| EP | 2 211 415 A1 | 7/2010 | |
| JP | H11-134937 * | 5/1999 | ............ Y02E 60/10 |

(Continued)

OTHER PUBLICATIONS

International Preliminary Report of Patentability dated Nov. 24, 2011, in PCT/JP2010/002538 (English-language translation only).
(Continued)

*Primary Examiner* — James Lee
(74) *Attorney, Agent, or Firm* — Oblon, McClelland, Maier & Neustadt, L.L.P.

(57) ABSTRACT

A method for producing a solid electrolyte, comprising: grinding raw materials comprising lithium sulfide and phosphorus sulfide in a hydrocarbon solvent, optionally comprising stirring a slurry comprising the raw materials and the hydrocarbon solvent in a reaction vessel, and optionally, circulating the slurry through a connecting pipe, wherein the method is carried out in an apparatus comprising the grinder, the reaction vessel and the connecting pipe that connects the grinder and the reaction vessel.

21 Claims, 5 Drawing Sheets

Related U.S. Application Data application No. 13/260,054, filed as application No. PCT/JP2010/002538 on Apr. 7, 2010, now Pat. No. 9,051,201.

(51) Int. Cl.

| | | |
|---|---|---|
| H01B 1/12 | (2006.01) | |
| H01M 10/052 | (2010.01) | |
| C03C 1/02 | (2006.01) | |
| C03C 3/32 | (2006.01) | |
| C03C 4/18 | (2006.01) | |
| C03C 10/00 | (2006.01) | |
| C03C 12/00 | (2006.01) | |
| H01M 4/13 | (2010.01) | |
| H01M 4/62 | (2006.01) | |

(52) U.S. Cl.
CPC ............. *C03C 3/321* (2013.01); *C03C 4/18* (2013.01); *C03C 10/00* (2013.01); *C03C 12/00* (2013.01); *H01B 1/122* (2013.01); *H01M 4/13* (2013.01); *H01M 4/62* (2013.01); *H01M 10/052* (2013.01); *C03B 2201/86* (2013.01); *H01M 2300/0068* (2013.01); *Y02E 60/10* (2013.01); *Y02P 70/50* (2015.11); *Y02T 10/70* (2013.01)

(56) References Cited

FOREIGN PATENT DOCUMENTS

| JP | 2004-265685 | 9/2004 |
|---|---|---|
| JP | 2008-4334 | 1/2008 |
| JP | 2008-4459 | 1/2008 |
| JP | 2008-021424 | 1/2008 |
| JP | 2008-103204 A | 5/2008 |
| JP | 2009-093995 A | 4/2009 |
| JP | 2009-110920 | 5/2009 |
| JP | 2010-30889 | 2/2010 |
| JP | 2010-40511 | 2/2010 |
| JP | 2010-140893 | 6/2010 |
| WO | WO 2004/093099 A1 | 10/2004 |
| WO | WO 2009/047977 A1 | 4/2009 |
| WO | WO 2010/004401 A1 | 1/2010 |

OTHER PUBLICATIONS

Written Opinion of the International Searching Authority dated Jul. 13, 2010, in PCT/JP2010/002538 (English-language translation only).

International Search Report dated Jul. 13, 2010, in PCT/JP2010/002538.

Extended European Search Report dated May 2, 2014 in Patent Application No. 10761436.4.

Tsutomu Minami, et al., "Recent progress of glass and glass-ceramics as solid electrolytes for lithium secondary batteries" Solid State Ionics, vol. 177, No. 26-32, XP027895631, Oct. 31, 2006, pp. 2715-2720.

Extended European Search Report dated Jun. 19, 2018 in corresponding European Patent Application No. 18164376.8, 9 pages.

Kawasaki et al. JP 2008-021424.31, Jan. 2008. English machine translation.

* cited by examiner

GLASS COMPRISING SOLID ELECTROLYTE PARTICLES AND LITHIUM BATTERY

CROSS REFERENCE TO RELATED APPLICATIONS

The present application is a divisional of U.S. patent application Ser. No. 14/680,514, filed on Apr. 7, 2015, which is a divisional of U.S. patent application Ser. No. 13/260, 054, filed on Sep. 23, 2011, the text of which is incorporated by reference, which is a National Stage entry under 35 U. S. C. 371 of PCT/JP 10/002538, filed on Apr. 7, 2010 and claims priority to Japanese Patent Application No. 2009-096482, filed on Apr. 10, 2009.

TECHNICAL FIELD

The invention relates to glass that includes solid electrolyte particles, a glass ceramic, and a lithium battery using the same.

BACKGROUND ART

In recent years, a high-performance lithium secondary battery or the like has been increasingly demanded for a portable information terminal, a portable electronic instrument, a domestic small power storage device, a motorcycle, an electric vehicle, and a hybrid electric vehicle that utilize a motor as the power source, and the like. The term "secondary battery" refers to a battery that can be charged and discharged. A secondary battery has been used in a wide variety of applications, and a further improvement in safety and performance has been desired.

An electrolyte that exhibits high lithium ion conductivity at room temperature has been generally limited to an organic electrolyte. An organic electrolyte is flammable due to inclusion of an organic solvent. Therefore, leakage or ignition may occur when using an ion-conductive material containing an organic solvent as an electrolyte for a battery. Moreover, since the organic electrolyte is liquid, conduction of counter anions occurs in addition to conduction of lithium ions. Therefore, the lithium ion transport number is equal to or less than "1".

An inorganic solid electrolyte is nonflammable, and is highly safe as compared with the organic electrolyte which is usually used. However, since the electrochemical performance of the inorganic solid electrolyte is inferior to some extent as compared with the organic electrolyte, it is necessary to further improve the performance of the inorganic solid electrolyte.

In view of the above situation, a sulfide solid electrolyte has been extensively studied.

For example, sulfide glass having an ion conductivity of $10^{-3}$ S/cm (e.g., LiI—$Li_2S$—$P_2S_5$, LiI—$Li_2S$—$B_2S_3$, and LiI—$Li_2S$—$SiS_2$) was discovered in the 1980's as a lithium-ion-conductive solid electrolyte having high ionic conductivity.

These electrolytes are normally solids, and ground (homogenized) by milling to obtain solid electrolyte particles (Patent Document 1). An electrolyte may also be obtained by a heat melting method at a high temperature (Patent Document 2).

RELATED-ART DOCUMENT

Patent Document

Patent Document 1: JP-A-2004-265685
Patent Document 2: JP-A-2008-4334

SUMMARY OF THE INVENTION

The homogeneity of the surface of the electrolyte is important for stabilizing the performance of the battery (end product). Since the surface of the electrolyte is a medium where lithium ions move directly, the resistance may increase partially if the homogeneity of the surface of the electrolyte is poor, so that a stable battery performance may not be obtained. When producing a glass ceramic, a crystal that exhibits excellent conductivity may not be formed partially if the homogeneity is poor, so that the battery performance may deteriorate when the electrolyte is incorporated in the battery. Therefore, solid electrolyte particles having improved homogeneity have been desired.

An object of the invention is to stabilize the performance of a lithium secondary battery by eliminating inhomogeneity of the surface of glass.

The inventors of the invention conducted extensive studies, and found that glass obtained by a specific production method exhibits high homogeneity. This finding has led to the completion of the invention.

The invention provides the following glass and the like.
1. Glass including an aggregate of solid electrolyte particles including Li, P, and S, where in when a Raman spectrum of the glass is repeatedly measured and a peak at 330 to 450 $cm^{-1}$ in each Raman spectrum is separated to waveforms of individual components, a standard deviation of a wave form area ratio of each component is less than 4.0 (e.g., 0.5 or more and less than 4.0).
2. The glass according to 1, wherein the area ratios of $PS_4^{3-}$, $P_2S_7^{4-}$, and $P_2S_6^{4-}$ in Raman spectrum are 15 to 65%, 25 to 80%, and 5 to 30%, respectively.
3. The glass according to 1 or 2, wherein the solid electrolyte particles have a maximum particle size of 20 μm or less.
4. Glass produced by alternately performing the step of reacting raw materials including at least lithium sulfide and other sulfides in a hydrocarbon solvent while grinding the raw materials, and the step of reacting the raw materials including at least lithium sulfide and other sulfides in a hydrocarbon solvent.
5. Glass produced by reacting raw materials including at least lithium sulfide and other sulfides in a hydrocarbon solvent.
6. A glass ceramic obtained by heating the glass according to any one of 1 to 5.
7. A lithium battery including an electrolyte layer, a positive electrode, and a negative electrode, at least one of the electrolyte layer, the positive electrode and the negative electrode including at least one of the glass according to any one of 1 to 5 and the glass ceramic according to 6.
8 An apparatus including the lithium battery according to 7.

According to the invention, it is possible to stabilize the performance of a lithium secondary battery by eliminating inhomogeneity of the surface of glass.

DESCRIPTION OF EXEMPLARY EMBODIMENTS

Glass according to the invention includes an aggregate of solid electrolyte particles including Li, P, and S, wherein when a Raman spectrum of the glass is repeatedly measured, and a peak at 330 to 450 cm$^{-1}$ in each Raman spectrum is separated to waveforms of individual components, a standard deviation of a waveform area ratio of each component being less than 4.0. The glass exhibits excellent homogeneity when the standard deviation of the waveform area ratio of each component is less than 4.0.

The Raman spectrum is used to determine the state of a solid, a powder, or the like (see Japanese Patent No. 3893816, Japanese Patent No. 3893816, Japanese Patent No. 3929303, Japanese Patent No. 3979352, and Japanese Patent No. 4068225, for example). The Raman spectrum is suitably used when analyzing the surface state of a solid. Even if particles from the same lot are measured, when the composition of their surface is inhomogenous, a different spectrum is obtained. For example, when subjecting a solid material to mechanical milling, if part of the solid material has been sufficiently ground, and another part of the solid material has not been sufficiently ground and adheres to the wall, the reproducibility of the spectrum is adversely affected due to a decrease in homogeneity. Since the Raman spectrum is an index of a homogeneous material, the invention utilizes the reproducibility of the spectrum (particularly the variance value) as an index.

Figure 1:
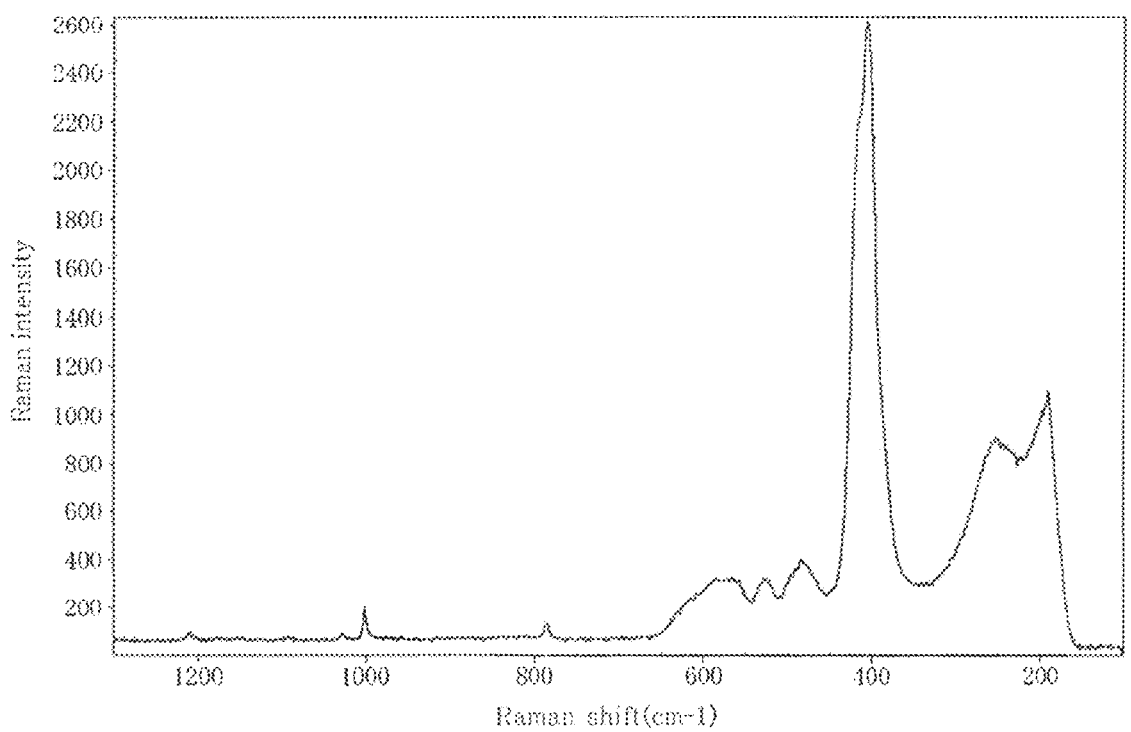
FIG. 1 shows the Raman spectrum of glass obtained in Example 1.
Figure 2:
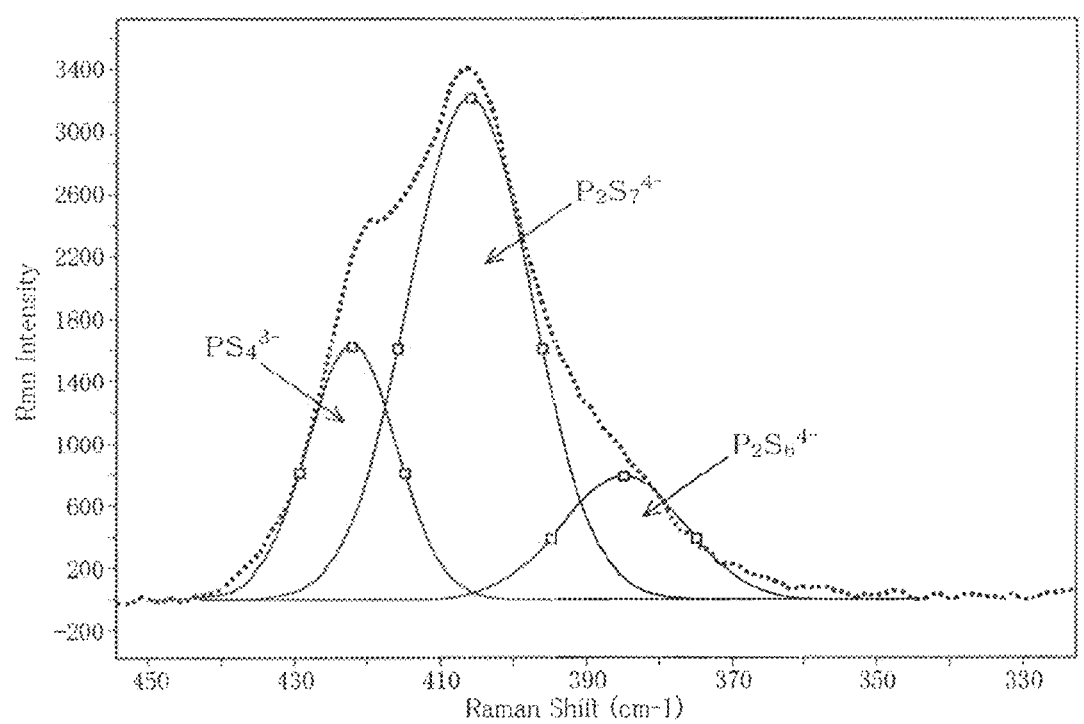
FIG. 2 is a view showing a state in which the peak in the Raman spectrum of glass obtained in Example 1 is separated to waveforms.

FIG. 1 shows an example of the Raman spectrum of the glass according to the invention. The Raman spectrum measurement conditions used herein are described in the examples. As shown in FIG. 1, a characteristic peak is detected at around 400 cm$^{-1}$. Since the peak is unsymmetrical, the peak is a composite peak of a plurality of components. The peak is identified as a three-component composite peak of $PS_4^{3-}$, $P_2S_7^{4-}$, and $P_2S_6^{4-}$ (M. Tachez, J.-P. Malugani, R. Mercier, and G. Robert, Solid State Ionics, 14, 181 (1984)). It is desirable to individually detect the peak using a high-resolution system. However, even if the peak is not sufficiently separated, it is possible to separate the peak into individual peaks using common or dedicated waveform analysis software. FIG. 2 shows the results when separating the peak into individual peaks using waveform separation software (the dotted line in FIG. 2 indicates the original peak). The area ratio of each component can be calculated using this method.

The standard deviation can be calculated from the above-mentioned area value using a general calculation method.

It is desirable to measure the Raman spectrum five or more times while changing the measurement sample tube or changing the measurement position of an identical measurement sample tube.

Note that the Raman spectrum was measured five times in the examples while changing the measurement position of an identical measurement sample tube.

If the standard deviation of the area ratio of the waveform that indicates each of $PS_4^{3-}$, $P_2S_7^{4-}$, and $P_2S_6^{4-}$ is less than 4.0, the surface of each glass particle is homogeneous, and the performance of a battery produced using the glass particles is stabilized.

The standard deviation is preferably 3.5 or less, and more preferably 3.0 or less.

The standard deviation of the area ratio of the waveform that indicates $PS_4^{3-}$ is preferably 3.0 or less. The standard deviation of the area ratio of the waveform that indicates $P_2S_7^{4-}$ is preferably 2.5 or less. The standard deviation of the area ratio of the waveform that indicates $P_2S_6^{4-}$ is preferably 2.0 or less. The standard deviation of the area ratio of the waveform that indicates $PS_4^{3-}$ is more preferably 2.5 or less. The standard deviation of the area ratio of the waveform that indicates $P_2S_7^{4-}$ is more preferably 2.0 or less. The standard deviation of the area ratio of the waveform that indicates $P_2S_6^{4-}$ is more preferably 1.5 or less.

The area ratios of $PS_4^{3-}$, $P_2S_7^{4-}$, and $P_2S_6^{4-}$ in the Raman spectrum are preferably 15 to 65%, 25 to 80%, and 5 to 30%, and more preferably 20 to 55%, 35 to 75%, and 5 to 25%, respectively. Since the $P_2S_6^{4-}$ component has inferior lithium ion conductivity as compared with the other components, the battery performance is more improved when the $P_2S_6^{4-}$ content is lower.

The maximum particle size of the solid electrolyte particles that form the glass according to the invention, determined by observing an SEM photograph thereof, is preferably 20 μm or less, and more preferably 15 μm or less. The term "maximum particle size" used herein refers to the maximum linear distance from the surface of a particle to another surface of the particle. If large particles having a particle size of more than 20 μm are present, the uniformity (homogeneity) achieved when forming a sheet may be (adversely) affected. The presence of large particles may cause a variation in heat transfer during a heat treatment, may hinder fusion bonding, and may cause defects.

The number average particle size of the solid electrolyte particles is preferably 10 μm or less, and more preferably 8 μm or less.

If the solid electrolyte particles have a large particle size, it may be necessary to increase the thickness of the electrolyte layer of the battery.

A homogeneous electrolyte may also be confirmed by a DSC pattern. An inhomogeneous electrolyte normally shows a bimodal peak pattern or a wide half-width temperature range. A homogeneous electrolyte shows a single peak and a narrow half-width temperature range. The glass according to the invention normally has a peak temperature between 225° C. and 270° C. and a half-width temperature of 10° C. or less (particularly 5° C. or less). The measurement method is described in the examples.

The solid electrolyte that forms the glass according to the invention includes Li, P, and S. The sulfide-based solid electrolyte includes Li, P, and S as the main components. The solid electrolyte may include only Li, P, and S, or may further include an additional substance such as Al, B, Si, and Ge.

The homogenous glass according to the invention may be produced by reacting raw materials including lithium sulfide and other sulfides in a hydrocarbon solvent. Specifically, the glass according to the invention is, unlike conventional methods, produced without using mechanical milling, or without rapidly cooling the raw materials melted by heating.

Mechanical milling may cause the particles present on the wall and the balls inside the mill to have an inhomogenous surface state. When rapidly cooling the raw materials melted by heating to form glass, and grinding the glass to obtain glass particles, the glass particles are difficult to have a homogeneous surface.

The temperature when causing the raw materials to come in contact with each other in the hydrocarbon solvent is normally 80 to 300° C., preferably 100 to 250° C., and more preferably 100 to 200° C. The contact (reaction) time is normally 5 minutes to 50 hours, and preferably 10 minutes to 40 hours.

Note that temperature and time may be combined according to conditions.

It is preferable to stir the raw materials when causing the raw materials to come in contact with each other. It is preferable to stir the raw materials in an inert gas atmosphere (e.g., nitrogen or argon). The dew point of the inert gas is preferably −20° C. or less, and particularly preferably −40° C. or less. The pressure is normally ordinary pressure to 100 MPa, and preferably ordinary pressure to 20 MPa.

The solid electrolyte may be produced using general-purpose equipment (e.g., reaction vessel or autoclave) in the method. Specifically, special equipment such as equipment that withstands a high temperature is unnecessary. The amount of solvent that remains in the solid electrolyte can be reduced by utilizing the hydrocarbon solvent.

The glass according to the invention may also be produced by alternately performing the step of reacting raw materials including lithium sulfide and other sulfides in a hydrocarbon solvent while grinding the raw materials, and the step of reacting the raw materials including lithium sulfide and other sulfides in a hydrocarbon solvent.

For example, the raw materials are reacted in a grinder while grinding the raw materials to synthesize a solid electrolyte, the raw materials are separately reacted in a hydrocarbon solvent in a reaction vessel to synthesize a solid electrolyte, and the raw materials during the reaction are circulated between the grinder and the reaction vessel.

Figure 4:
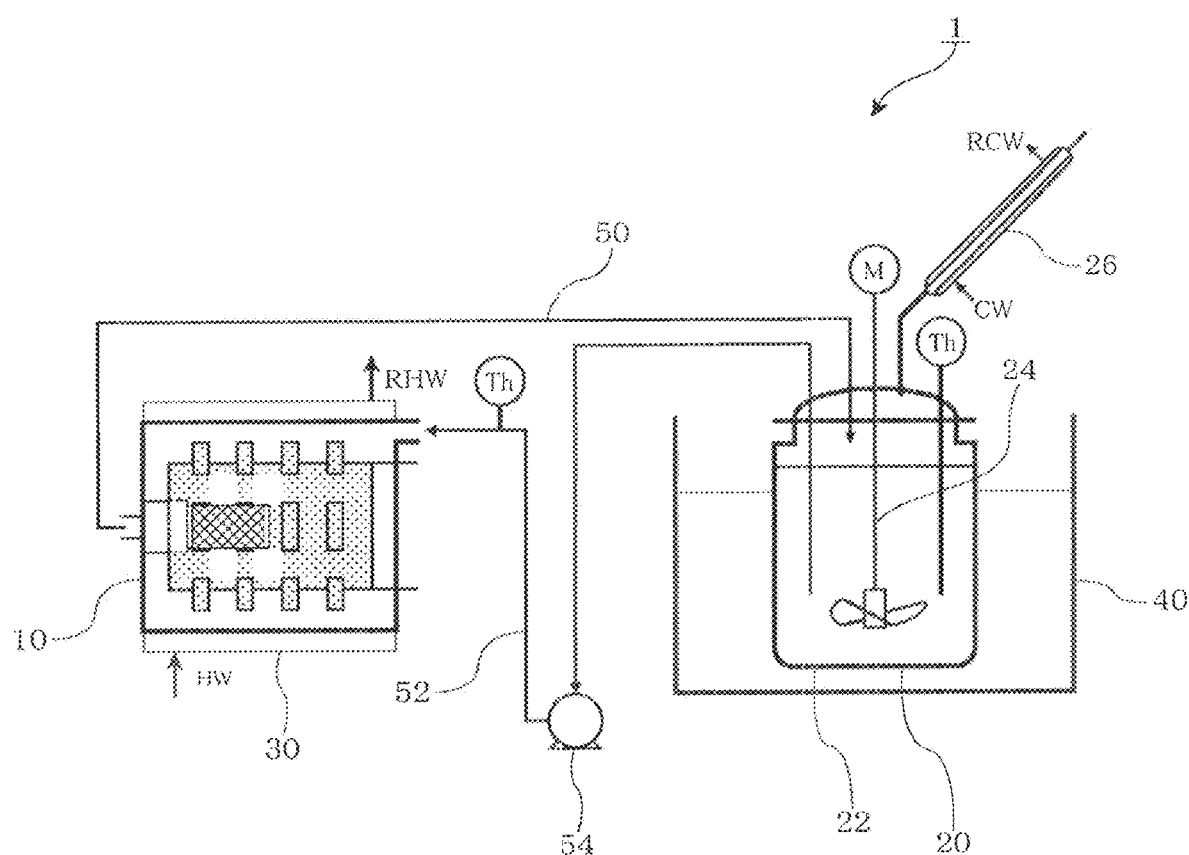
FIG. 4 is a view showing an example of an apparatus that may be used for the production method according to the invention.

FIG. 4 shows an example of an apparatus that may be used for the production method according to the invention.

In an apparatus 1 shown in FIG. 4, the hydrocarbon solvent and the raw materials are supplied to a grinder 10 and a reaction vessel 20. Hot water is supplied to (HW) and discharged from (RHW) a heater 30. The temperature inside the grinder 10 is kept using the heater 30, and the raw materials are reacted while grinding the raw materials in the hydrocarbon solvent to synthesize a solid electrolyte. The temperature inside the reaction vessel 20 is kept using an oil bath 40, and the raw materials are reacted in the hydrocarbon solvent to synthesize a solid electrolyte. The temperature inside the reaction vessel 20 is measured using a thermometer (Th). The reaction system is stirred by rotating a stirring blade 24 using a motor (M) so that a slurry formed by the raw materials and the solvent does not precipitate. Cooling water is supplied to (CW) and discharged from (RCW) a cooling tube 26. The cooling tube 26 cools and liquefies the solvent vaporized in a container 22, and returns the solvent to the container 22. When synthesizing the solid electrolyte in the grinder 10 and the reaction vessel 20, the raw materials during the reaction are circulated by a pump 54 between the grinder 10 and the reaction vessel 20 through connecting pipes 50 and 52. The temperature of the raw materials and the solvent supplied to the grinder 10 is measured using a thermometer (Th) provided to the second connecting pipe on the upstream side of the grinder 10.

Examples of the grinder 10 include a rotary mill (a tumbling mill), a swing mill, a vibration mill, and a bead mill. It is preferable to use a bead mill since the raw materials can be finely ground. The reactivity of the raw materials increases as the size of the raw materials decreases, so that the solid electrolyte can be produced within a short time.

When the grinder includes balls, it is preferable that the balls be made of zirconium, reinforced alumina, or alumina in order to prevent a situation in which the materials of the balls and the container are mixed into the solid electrolyte due to wear. In order to prevent a situation in which the balls enter the reaction vessel 20 from the grinder 10, a filter that separates the balls from the raw materials and the solvent may optionally be provided in the grinder 10 or the first connecting pipe 50.

The grinding temperature in the grinder is preferably 20° C. or more and 90° C. or less, and more preferably 20° C. or more and 80° C. or less. If the grinding temperature in the grinder is less than 20° C. the effect of reducing the reaction time may be small. If the grinding temperature in the grinder exceeds 90° C., the strength of zirconia, reinforced alumina, or alumina used as the material for the container and the balls may significantly decrease, whereby wear or deterioration of the container and the balls may occur, or the electrolyte may be contaminated.

The reaction temperature in the container 22 is preferably 60° C. to 300° C. The reaction temperature in the container 22 is more preferably 80° C. to 200° C. If the reaction temperature in the container 22 is less than 60° C., the vitrification reaction may take time, so that a sufficient production efficiency may not be achieved. If the reaction temperature in the container 22 exceeds 300° C. undesirable crystals may be deposited.

It is preferable to employ a high temperature since the reaction rate increases at a high temperature. However, when increasing the temperature of the grinder, mechanical problems (e.g., wear) may occur. Therefore, it is preferable to set the reaction temperature in the reaction vessel at a high temperature, and maintain the temperature in the grinder at a relatively low temperature.

The reaction time is normally 5 minutes to 50 hours, and preferably 10 minutes to 40 hours.

Figure 5:
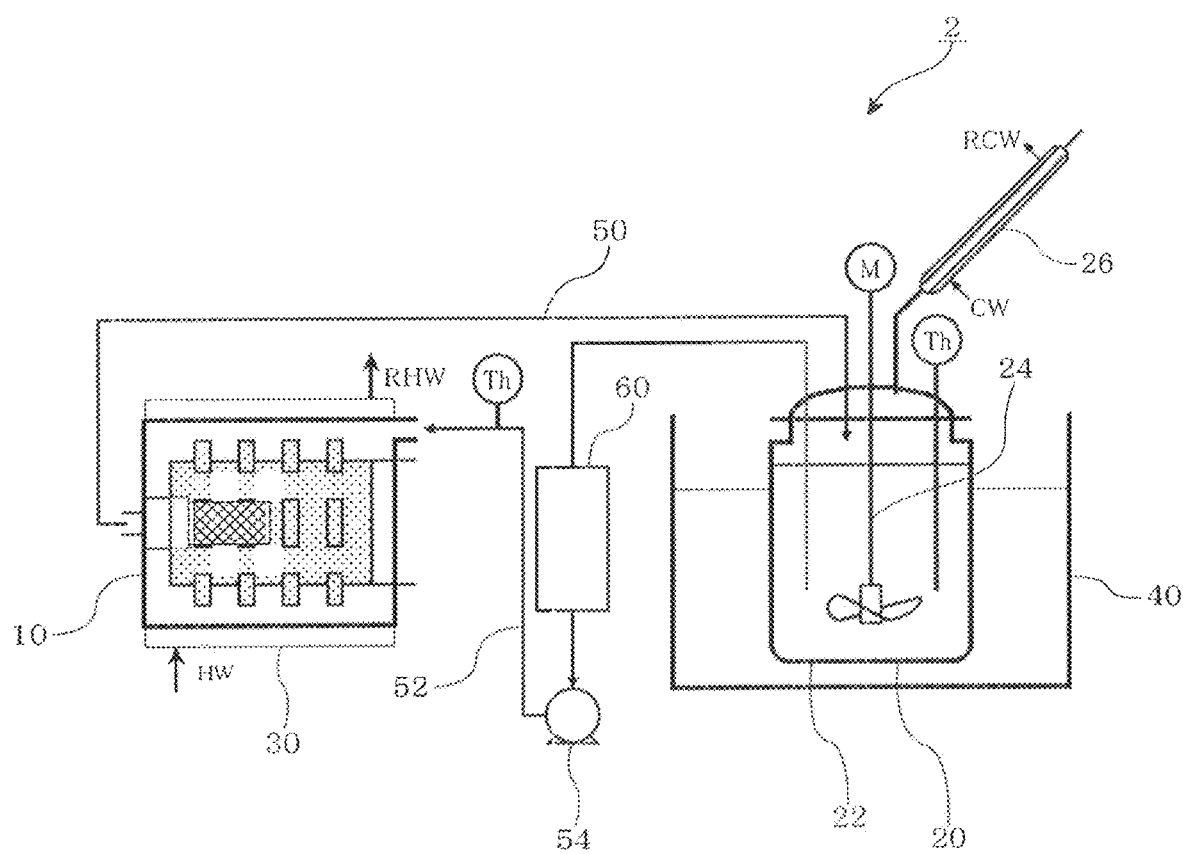
FIG. 5 is a view showing another example of an apparatus that may be used for the production method according to the invention.

As shown in FIG. 5, a heat exchanger 60 (heat-exchange means) may be provided to the second connecting pipe 52, and the high-temperature raw materials and solvent discharged from the reaction vessel 20 may be cooled, and then supplied to the grinder 10.

In the above production method, it is preferable to use $Li_2S$ and other sulfides as the raw materials. One or more sulfides selected from phosphorus sulfide, silicon sulfide, boron sulfide, germanium sulfide, and aluminum sulfide are preferable as the sulfides mixed with $Li_2S$. It is particularly preferable to use $P_2S_5$.

Lithium sulfide is preferably used in an amount of 30 to 95 mol %, more preferably 40 to 90 mol %, and particularly preferably 50 to 85 mol %, based on the total amount of lithium sulfide and other sulfides.

Lithium sulfide ($Li_2S$) and phosphorus pentasulfide ($P_2S_5$), or lithium sulfide, phosphorus, and sulfur, or lithium sulfide, phosphorus pentasulfide, phosphorus, and/or sulfur are normally used.

When mixed, the molar ratio of lithium sulfide to phosphorus pentasulfide, or phosphorus and sulfur is normally 50:50 to 80:20, and preferably 60:40 to 75:25. The molar ratio "$Li_2S:P_2S_5$" is particularly preferably about 70:30.

Examples of the hydrocarbon solvent include saturated hydrocarbons, unsaturated hydrocarbons, aromatic hydrocarbons, and the like. Examples of the saturated hydrocarbons include hexane, pentane, 2-ethylhexane, heptane, octane, decane, cyclohexane, methylcyclohexane, IP Solvent 1016 (manufactured by Idemitsu Kosan Co., Ltd.), IP Solvent 1620 (manufactured by Idemitsu Kosan Co., Ltd.), and the like. Examples of the unsaturated hydrocarbons include hexene, heptene, cyclohexene, and the like.

Examples of the aromatic hydrocarbons include toluene, xylene, ethylbenzene, decalin, 1,2,3,4-tetrahydronaphthalene, and mixed solvents such as Ipzole 100 (manufactured by Idemitsu Kosan Co., Ltd.) and Ipzole 150 (manufactured by Idemitsu Kosan Co., Ltd.). Among these, toluene, xylene, ethylbenzene, and Ipzole 150 are preferable.

It is preferable that the water content in the hydrocarbon solvent be 50 ppm (weight) or less taking account of a reaction with the raw material sulfide and the synthesized solid electrolyte. The sulfide-based solid electrolyte may be modified due to a reaction with water, so that the performance of the solid electrolyte may deteriorate. Therefore, it is preferable that the water content in the hydrocarbon solvent be as low as possible (more preferably 30 ppm or less, and still more preferably 20 ppm or less).

An additional solvent may optionally be added to the hydrocarbon solvent. Specific examples of the additional solvent include ketones such as acetone and methyl ethyl ketone, ethers such as tetrahydrofuran, alcohols such as ethanol and butanol, esters such as ethyl acetate, halogenated hydrocarbons such as dichloromethane and chlorobenzene, and the like.

The organic solvent is preferably used in such an amount that lithium sulfide and other sulfides (raw materials) form a solution or a slurry when the solvent is added. The raw materials are normally added in a total amount of about 0.03 to 1 kg based on 1 kg of the solvent. The raw materials are preferably added in a total amount of 0.05 to 0.5 kg, and particularly preferably 0.1 to 0.3 kg based on 1 kg of the solvent.

The reaction product is dried, and the solvent is removed to obtain sulfide glass.

The ion conductivity of the sulfide-based solid electrolyte can be improved by heating the resulting glass normally at 200° C. or more and 400° C. or less, and preferably 250 to 320° C. This is because the sulfide-based solid electrolyte (glass) is converted into sulfide crystallized glass (glass ceramic). The heating time is preferably 1 to 5 hours, and particularly preferably 1.5 to 3 hours.

Note that heating in the drying step and heating in the crystallization step may be performed by a single heating step.

The glass or the glass ceramic according to the invention may be used as a solid electrolyte layer of an all-solid-state lithium secondary battery, a solid electrolyte to be mixed into a positive electrode material or a negative electrode material, or the like. A lithium battery according to the invention includes an electrolyte layer, a positive electrode, a negative electrode, and at least one of the electrolyte layer, the positive electrode and the negative electrode includes the glass or the glass ceramic according to the invention that is included in one or more of the electrolyte layer, the positive electrode, and the negative electrode.

EXAMPLES

Production Example 1

(1) Production of Lithium Sulfide

Lithium sulfide was produced by the method according to the first embodiment (two-step method) disclosed in JP-A-7-330312. Specifically, a 10-liter autoclave equipped with a stirring blade was charged with 3326.4 g (33.6 mol) of N-methyl-2-pyrrolidone (NMP) and 287.4 g (12 mol) of lithium hydroxide. The mixture was heated to 130° C. with stirring (300 rpm). After heating, hydrogen sulfide was bubbled into the mixture for 2 hours at a rate of 3 L/min. The temperature of the reaction solution was increased in a nitrogen stream (200 cc/min) to desulfurize and hydrogenate the reacted lithium hydrosulfide and obtain lithium sulfide. Water produced by the reaction between hydrogen sulfide and lithium hydroxide as a by-product started to evaporate as the temperature of the reaction solution increased. The evaporated water was condensed using a condenser, and removed from the system. The temperature of the reaction solution increased when water was distilled away from the system. The temperature rising operation was stopped when the temperature reached 180° C., and the system was maintained at a constant temperature. After completion of desulfurization and hydrogenation (about 80 minutes), the reaction was terminated to obtain lithium sulfide.

(2) Purification of Lithium Sulfide

After decanting NMP in 500 mL of the slurry reaction solution (NMP-lithium sulfide slurry) obtained in (1), 100 mL of dehydrated NMP was added to the reaction solution. The mixture was stirred at 105° C. for about 1 hour. NMP was decanted at 105° C. After the addition of 100 mL of NMP, the mixture was stirred at 105° C. for about 1 hour, and NMP was decanted at 105° C. The same operation was repeated four times in total. After completion of decantation, lithium sulfide was dried at 230° C. (i.e., a temperature equal to or higher than the boiling point of NMP) for 3 hours in a nitrogen stream under normal pressure. The impurity content in the resulting lithium sulfide was measured.

The content of sulfur oxides which are lithium sulfite ($Li_2SO_3$), lithium sulfate ($Li_2SO_4$), lithium thiosulfate ($Li_2S_2O_3$), and lithium N-methylaminobutyrate (LMAB) was determined by ion chromatography. As a result, the total content of the sulfur oxides was 0.13 mass %, and the content of lithium N-methylaminobutyrate (LMAB) was 0.07 mass %.

$Li_2S$ thus purified was used in the following examples.

Example 1

The apparatus shown in FIG. 5 was used. A bead mill "Star Mill Miniature" (0.15 l) (manufactured by Ashizawa Finetech Ltd.) was used as the stirrer. 450 g of zirconia balls having a diameter of 0.5 mm were used as the media. A glass reactor (1.5 L) equipped with a stirrer was used as the reaction vessel.

A mixture prepared by adding 1080 g of dehydrated toluene (water content 10 ppm or less) to 39.05 g (70 mol %) of $Li_2S$ produced in Production Example 1 and 80.95 g (30 mol %) of $P_2S_5$ (manufactured by Aldrich) was put in the reaction vessel and the mill.

The mixture was circulated at a flow rate of 400 mL/min using a pump, and the reaction vessel was heated to 80° C. Hot water was externally circulated into the mill so that the liquid temperature was maintained at 70° C., and the mill was operated at a circumferential speed of 10.9 m/s. After reacting the mixture for 8 hours, the mixture was vacuum-dried at 150° C. to obtain a white powder.

The Raman spectrum of the powder obtained was measured five times under the following measurement conditions.

Measuring apparatus: Almega (manufactured by Thermo Fisher Scientific K.K.)

Laser wavelength: 532 nm, laser output: 10%, aperture: 25 µm (diameter), exposure time: 10 seconds, exposure count: 10, objective lens: ×100, resolution: high (2400 lines/mm)

FIG. 1 shows the average Raman spectrum of the five measurements. In each measurement, the peak at 330 to 450 cm$^{-1}$ in the Raman spectrum was separated to waveforms of the $PS_4^{3-}$, $P_2S_7^{4-}$, and $P_2S_6^{4-}$ components (see FIG. 2) using waveform separation software ("GRAMS Al" manufactured by Thermo SCIENTIFIC), and the waveform area ratio of each component was calculated. The dotted line in FIG. 2 indicates the original peak. Five Raman spectra were subjected to waveform separation, and the waveform area ratio of each component was calculated. The average value and the standard deviation of the waveform area ratio of the five Raman spectra were calculated. The results are shown in Table 1.

Figure 3:
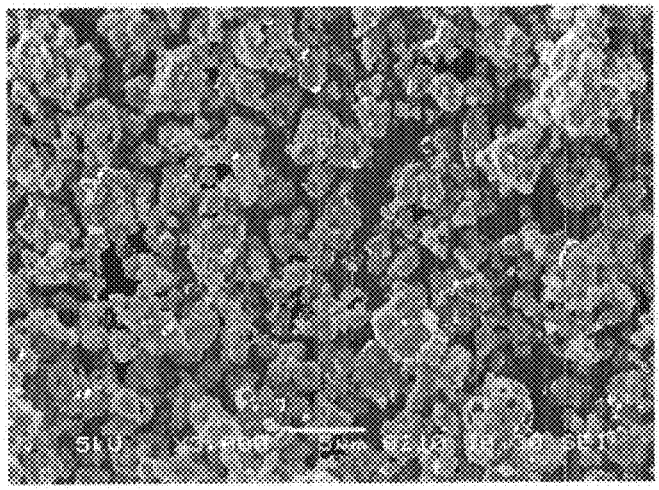
FIG. 3 shows a scanning electron microscope (SEM) photograph of the glass powder obtained in Example 3.

The resulting powder was observed using an SEM at a magnification of 3000 at which about one hundred particles were observed within the field of view (8 fields in total). The maximum particle size of the solid electrolyte particles was 10 µm or less. FIG. 3 shows the SEM image.

The powder obtained was also subjected to DSC measurement under the following conditions. The DSC measurement was performed using a system "MODEL DSC-7" (manufactured by Perkin Elmer). The powder was kept at 30° C. for 15 minutes, and then heated to 400° C. at 10° C./min. The enthalpy of fusion was calculated from the peak area. It was found that the powder had a peak at 253° C. The enthalpy of fusion (ΔH) was 42.7 J/g, and the peak half-width temperature was 4.3° C.

The ion conductivity of the powder obtained was also measured, and found to be $1.2 \times 10^{-4}$ S/cm.

The product reacted for 8 hours was put in an airtight container, and heated at 300° C. for 2 hours. The sample then was subjected to X-ray diffraction measurement. A peak was observed at 2θ=17.8, 18.2, 19.8, 21.8, 23.8, 25.9, 29.5, and 30.0 deg attributed to the crystal phase of $Li_7P_3S_{11}$. The ion conductivity of the powder was measured, and found to be $1.8 \times 10^{-3}$ S/cm.

The ion conductivity was measured by the following method.

Specifically, a tablet making machine was charged with the solid electrolyte powder. A pressure of 4 to 6 MPa was applied to the solid electrolyte powder to obtain a formed body. A mixed material (electrode) prepared by mixing carbon and the solid electrolyte in a weight ratio of 1:1 was placed on each side of the formed body, and a pressure was applied to the formed body using the tablet making machine again to obtain a primary formed article. A pressure was applied to the primary formed article during heating at 200° C. to obtain a formed body for conductivity measurement (diameter: about 10 mm, thickness: about 1 mm). The ion conductivity of the formed body was determined by AC impedance measurement. The ion conductivity measured at 25° C. was employed.

Example 2

A glass powder was produced, and the Raman spectrum of the glass powder was measured in the same manner as in Example 1, except that the reaction time was changed to 12 hours. The results are shown in Table 1.

Example 3

A glass powder was produced, and the Raman spectrum of the glass powder was measured in the same manner as in Example 2, except that xylene was used as the reaction solvent. The results are shown in Table 1.

TABLE 1

|  | 1 | 2 | 3 | 4 | 5 | Average | Standard deviation |
|---|---|---|---|---|---|---|---|
| Example 1 |  |  |  |  |  |  |  |
| $PS_4^{3-}$ | 29.4 | 25.4 | 27.6 | 28.4 | 27.9 | 27.7 | 1.5 |
| $P_2S_7^{4-}$ | 57.7 | 62.3 | 59.3 | 59.3 | 57.9 | 59.3 | 1.8 |
| $P_2S_6^{4-}$ | 13.0 | 12.3 | 13.1 | 12.3 | 14.1 | 13.0 | 0.8 |
| Example 2 |  |  |  |  |  |  |  |
| $PS_4^{3-}$ | 23.9 | 23.7 | 23.2 | 25.1 | 24.1 | 24.0 | 0.7 |
| $P_2S_7^{4-}$ | 63.2 | 62.1 | 61.6 | 59.2 | 60.8 | 61.4 | 1.5 |
| $P_2S_6^{4-}$ | 12.9 | 14.3 | 15.2 | 15.8 | 15.1 | 14.7 | 1.1 |
| Example 3 |  |  |  |  |  |  |  |
| $PS_4^{3-}$ | 27.1 | 25.2 | 23.9 | 21.4 | 25.9 | 24.7 | 2.2 |
| $P_2S_7^{4-}$ | 58.8 | 59.1 | 60.3 | 60.8 | 57.8 | 59.4 | 1.2 |
| $P_2S_6^{4-}$ | 14.1 | 15.7 | 15.8 | 17.8 | 16.3 | 15.9 | 1.3 |

Comparative Example 1

3.905 g (70 mol %) of $Li_2S$ and 8.095 g (30 mol %) of $P_2S_5$ (manufactured by Aldrich) were used as the raw materials. The powders were weighed in a dry box charged with nitrogen, and put in an alumina pot used for a planetary ball mill together with alumina balls. The pot was then completely sealed in a state in which the pot was filled with nitrogen gas. The pot was installed in a planetary ball mill, and the powders were milled at a low speed (rotational speed: 85 rpm) for several minutes in order to sufficiently mix the raw materials. The rotational speed was then gradually increased, and mechanical milling was performed at 370 rpm for a given time. The Raman spectrum of the resulting glass powder was measured in the same manner as in Example 1.

Table 2 shows the area ratio of the Raman spectrum obtained in Comparative Example 1. The standard deviation tended to decrease with the passage of time. However, homogeneity obtained in the examples was not obtained even after the powders (raw materials) were milled for 280 hours.

When observing the glass powder obtained using an SEM, large particles having a particle size of more than 20 µm were present. The ion conductivity of the glass powder obtained was $1.0 \times 10^{-4}$ S/cm, and was $1.3 \times 10^{-3}$ S/cm when the glass powder had been heated at 300° C. for 2 hours. A DSC chart was determined in the same manner as in Example 1. A pattern having two or more peaks was obtained.

TABLE 2

| Sample | Ion species | 1 | 2 | 3 | 4 | 5 | Average | Standard deviation |
|---|---|---|---|---|---|---|---|---|
| Milling 60 hr | $PS_4^{3-}$ | 34.2 | 36.5 | 37.7 | 30.0 | 42.3 | 36.1 | 4.5 |
|  | $P_2S_7^{4-}$ | 55.7 | 39.2 | 43.6 | 52.1 | 35.2 | 45.2 | 8.6 |
|  | $P_2S_6^{4-}$ | 10.1 | 24.3 | 18.7 | 17.9 | 22.5 | 18.7 | 5.5 |
| Milling 80 hr | $PS_4^{3-}$ | 37.0 | 43.8 | 37.5 | 41.7 | 39.4 | 39.9 | 2.9 |
|  | $P_2S_7^{4-}$ | 46.9 | 32.0 | 40.5 | 33.6 | 40.7 | 38.8 | 6.0 |
|  | $P_2S_6^{4-}$ | 16.1 | 24.2 | 21.9 | 24.7 | 19.9 | 21.4 | 3.5 |
| Milling 120 hr | $PS_4^{3-}$ | 40.8 | 35.4 | 40.1 | 40.1 | 36.8 | 38.6 | 2.4 |
|  | $P_2S_7^{4-}$ | 38.9 | 51.3 | 38.0 | 43.0 | 41.3 | 42.5 | 5.3 |
|  | $P_2S_6^{4-}$ | 20.3 | 13.3 | 21.9 | 16.9 | 21.9 | 18.9 | 3.7 |
| Milling 160 hr | $PS_4^{3-}$ | 36.7 | 37.1 | 34.5 | 42.1 | 39.4 | 38.0 | 2.9 |
|  | $P_2S_7^{4-}$ | 46.7 | 45.4 | 52.1 | 34.3 | 39.5 | 43.6 | 6.8 |
|  | $P_2S_6^{4-}$ | 16.5 | 17.5 | 13.5 | 23.6 | 21.0 | 18.4 | 4.0 |

TABLE 2-continued

| Sample | Ion species | 1 | 2 | 3 | 4 | 5 | Average | Standard deviation |
|---|---|---|---|---|---|---|---|---|
| Milling 200 hr | $PS_4^{3-}$ | 38.5 | 26.4 | 36.0 | 38.5 | 32.6 | 34.4 | 5.1 |
| | $P_2S_7^{4-}$ | 43.6 | 44.7 | 44.6 | 40.4 | 49.4 | 44.5 | 3.2 |
| | $P_2S_6^{4-}$ | 17.9 | 28.9 | 19.4 | 21.1 | 18.0 | 21.1 | 4.6 |
| Milling 280 hr | $PS_4^{3-}$ | 37.2 | 33.1 | 37.2 | 38.1 | 36.9 | 36.5 | 1.9 |
| | $P_2S_7^{4-}$ | 47.2 | 42.6 | 50.6 | 42.5 | 49.0 | 46.4 | 3.7 |
| | $P_2S_6^{4-}$ | 15.7 | 24.2 | 12.2 | 19.4 | 14.1 | 17.1 | 4.8 |

In Tables 1 and 2, each value was calculated using calculation software attached to the separation waveform software, or using Microsoft Excel. Each value was calculated to third to ten decimal places. A value rounded off to one decimal place is listed in Tables 1 and 2.

INDUSTRIAL APPLICABILITY

Since the glass and the glass ceramic according to the invention exhibit excellent homogeneity, the glass and the glass ceramic may suitably be used for a lithium secondary battery and the like.

Although only some exemplary embodiments and/or examples of the invention have been described in detail above, those skilled in the art will readily appreciate that many modifications are possible in the exemplary embodiments and/or examples without materially departing from the novel teachings and advantages of the invention. Accordingly, all such modifications are intended to be included within the scope of the invention.

The documents cited in the specification are incorporated herein by reference in their entirety.

The invention claimed is:

1. A method for producing a solid electrolyte, the method comprising:
   grinding raw materials comprising lithium sulfide and phosphorus sulfide in a hydrocarbon solvent.

2. The method according to claim 1, comprising:
   the grinding raw materials comprising lithium sulfide and phosphorus sulfide in the hydrocarbon solvent in a grinder,
   stirring a slurry comprising the raw materials and the hydrocarbon solvent in a reaction vessel, and
   circulating the slurry through a connecting pipe,
   wherein the method is carried out in an apparatus comprising the grinder, the reaction vessel and the connecting pipe that connects the grinder and the reaction vessel.

3. The method according to claim 1, wherein
   the grinding is carried out with a rotary mill, a swing mill, a vibration mill, or a bead mill.

4. The method according to claim 1, wherein
   the hydrocarbon solvent is a saturated hydrocarbon, an unsaturated hydrocarbon or an aromatic hydrocarbon.

5. The method according to claim 1, wherein
   the phosphorus sulfide is phosphorus pentasulfide, and a molar ratio of the lithium sulfide to the phosphorus pentasulfide is from 50:50 to 80:20.

6. The method according to claim 4, wherein
   the phosphorus sulfide is phosphorus pentasulfide, and a molar ratio of the lithium sulfide to the phosphorus pentasulfide is from 50:50 to 80:20.

7. The method according to claim 2, wherein
   the grinder is a rotary mill, a swing mill, a vibration mill, or a bead mill.

8. The method according to claim 2, wherein
   the grinder is a bead mill.

9. The method according to claim 8, wherein
   the hydrocarbon solvent is an aromatic hydrocarbon.

10. The method according to claim 8, wherein
    a reaction temperature in the reaction vessel is from 60° C. to 300° C.

11. The method according to claim 8, wherein
    a heat exchanger is provided to the connecting pipe, the heat exchanger cools the slurry discharged from the reaction vessel and then supplies the slurry to the grinder.

12. The method according to claim 9, wherein
    a heat exchanger is provided to the connecting pipe, the heat exchanger cools the slurry discharged from the reaction vessel and then supplies the slurry to the grinder.

13. The method according to claim 2, wherein
    a grinding temperature in the grinder is 20° C. or more and 90° C. or less.

14. The method according to claim 2, wherein
    the hydrocarbon solvent is a saturated hydrocarbon, an unsaturated hydrocarbon or an aromatic hydrocarbon.

15. The method according to claim 2, wherein
    the hydrocarbon solvent is an aromatic hydrocarbon.

16. The method according to claim 2, wherein
    the phosphorus sulfide is phosphorus pentasulfide.

17. The method according to claim 16, wherein
    a molar ratio of the lithium sulfide to the phosphorus pentasulfide is from 50:50 to 80:20.

18. The method according to claim 2, wherein
    a reaction temperature in the reaction vessel is from 60° C. to 300° C.

19. The method according to claim 2, wherein
    a heat exchanger is provided to the connecting pipe.

20. The method according to claim 19, wherein
    the heat exchanger cools the slurry discharged from the reaction vessel and then supplies the slurry to the grinder.

21. The method according to claim 1, further comprising:
    stirring a slurry comprising the raw materials and the hydrocarbon solvent.

* * * * *